COMPARATOR

Filed Oct. 25, 1955

INVENTORS
HENRY J. WHITE
CHARLES J. HESNER
BY
Ralph L. Thomas
ATTORNEY

United States Patent Office 2,959,768

Patented Nov. 8, 1960

2,959,768

COMPARATOR

Henry J. White, Watertown, Mass., and Charles J. Hesner, Hyde Park, N.Y., assignors to International Business Machines Corporation, New York, N.Y., a corporation of New York Filed Oct. 25, 1955, Ser. No. 542,545

1 Claim. (Cl. 340—149)

This invention relates to electrical comparator devices and more particularly to an improved high speed electrical device for comparing numbers or words.

In digital computers it is sometimes necessary to compare two numbers of the same radix in order to determine a course of action. For example, an operation such as read words from a drum may continue until a comparison is made, or alternatively an operation such as read from a drum may be inhibited until a comparison is made. Various other types of operations may be made dependent upon reaching a comparison or the lack of reaching a comparison.

According to the principles of the present invention, a relatively simple arrangement provides a high speed comparison with optimum accuracy. The comparator constitutes a register which has first and second inputs. Signals representative of a number applied to the first input establish conditions within the register representative of the number in true form; whereas signals representative of a number applied to the second input establish conditions within the register representative of the number in complement form. A reset input is provided to set the comparator register to zero. If a first word is applied to the first input after the comparator has been reset to zero and a second word is subsequently applied to the second input, then the comparator register will indicate the quantity of zero if the first and second words were the same. Otherwise stated, the comparator register will not indicate zero if the first and second words were unlike.

In the illustrated embodiments, a flip-flop register is provided with as many flip-flop stages as necessary wherein each flip-flop has two bistable states which arbitrarily represent zero and one in binary. A pulse applied to the zero input side, arbitrarily selected as one of the bistable states, conditions the flip-flop to represent a zero; while a pulse applied to the one input side, arbitrarily selected as the other of the bistable states, conditions the flip-flop to represent a one. A complement input terminal for each flip-flop serves to reverse the existing condition of the flip-flop when pulsed. A reset line, connected to the zero input of each flip-flop, is pulsed to set all flip-flops in the zero state. The first of two words to be compared is then supplied in parallel, with a pulse representing binary one and no pulse representing binary zero, to the corresponding one input sides of the comparator register. Thus the first word is represented in true form. The second word is then supplied in parallel, with a pulse representing a binary one and no pulse representing a binary zero, to the corresponding complement inputs of the comparator register. Thus it is seen that if certain flip-flops are set to the one state by the first word, these same flip-flops will be complemented to the zero state by the second word if, and only if, the second word is like the first.

If it is desired to indicate by a signal that a comparison was reached, then the zero output side of all flip-flops may be connected to an AND circuit. This AND circuit may provide an output signal which is normally negative but which becomes positive whenever a comparison is reached. The positive signal may be termed a "compare" signal. Alternatively, it may be desirable to indicate by a signal that no comparison was reached. In this case, the one output sides of the flip-flops may be connected to an OR circuit which may provide a positive control signal whenever any one of the flip-flops is in the one state and a negative control signal whenever all flip-flops are in the zero state. The positive control signal provided by the OR circuit may be termed a "no compare" signal. Either the compare signal or no compare signal may be employed to exercise direct control or inhibit control, depending in each case upon the type of control device employed.

Accordingly it is an object of the present invention to provide a simple device which accurately determines whether two words are alike.

Another object of the present invention is to provide a high speed comparator which develops a compare signal when two words being compared are identical.

A further object of this invention is to provide a high speed comparator which develops a no compare signal when two words being compared are unlike.

A still further object of the present invention is to provide a device which compares a given multidigit number with a series of multidigit numbers and supplies a control signal in response to each comparison.

Other objects of the invention will be pointed out in the accompanying drawings, which disclose, by way of example, the principle of the invention and the best mode, which has been contemplated, of applying that principle.

Figures 1, 2:
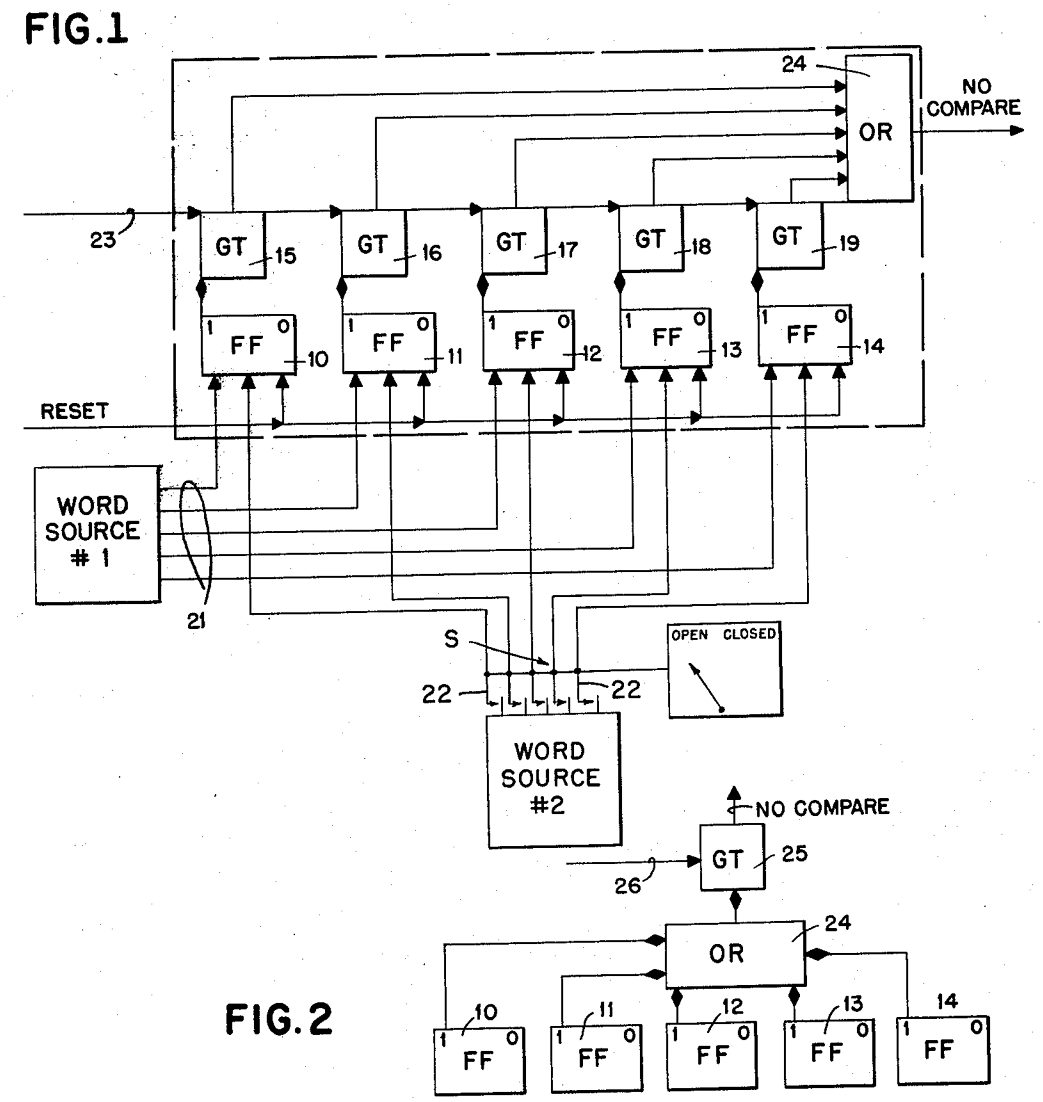
Fig. 1 shows in block schematic form one illustrative embodiment of a comparator constructed according to the principles of the present invention.
Fig. 2 shows in block schematic form a modification of the device illustrated in Fig. 2.

Reference is made to the illustrative embodiment of Fig. 1 wherein flip-flops 10 through 14 and gates 15 through 19, enclosed within the dotted line box 20, constitute a comparator. The gates, flip-flops, OR circuits and the AND circuit mentioned hereinafter may be any one of several suitable types known in the art, but they are preferably of the type shown and described in copending application Serial Number 414,459, filed March 5, 1954, by B. L. Sarahan et al. As shown and described in the above mentioned copending application, a positive pulse applied to the one input side of a flip-flop sets the flip-flop to the one state of conduction; whereas a positive pulse applied to the zero input side clears the flip-flop by setting it in the zero state of conduction; and a positive pulse applied to the complement input terminal, positioned in the center of the lower side of each flip-flop, reverses the existing state of the flip-flop. A pulse applied to the line labeled Reset clears the flip-flops 10 through 14 to the zero state of conduction. Where negative pulses are relied upon to trigger a flip-flop 10, 11, etc. one may rely upon a flip-flop of the type shown in Fig. 4 of the Hobbs Patent 2,719,959 issued on October 4, 1955. It is immaterial as to what specific flip-flop is relied upon in the practice of this invention so long as such flip-flop is capable of responding to a set pulse, a reset pulse, and a complementing pulse.

Word Source 1 and Word Source 2, shown in block form, may be any suitable type of equipment which supplies information signals on respective groups of conductors 21 and 22. In the preferred embodiment a positive signal established on individual conductors of the groups 21 and 22 represents a binary one and the absence of a positive signal represents a binary zero. Either the Word Source 1 or the Word Source 2 may be a magnetic drum device, a magnetic tape device, a punched card reader or other suitable storage devices.

In operation the flip-flops 10 through 14 are first cleared to zero by pulsing the reset line. Next a word is transferred from the Word Source 1 via the group of conductors 21 to the one input side of the flip-flops 10 through 14, and those lines which convey a positive signal representing a binary one cause the associated flip-flops to be set to the one state of conduction. A word from the Word Source 2 is next transferred by closing switch S (Fig. 1) via the conductors 22 to the complement inputs of the flip-flops 10 through 14. A positive signal, representative of a binary one, on any of the conductors 22 from the Word Source 2 causes the associated flip-flop to undergo a change from the existing stable state to the opposite stable state. A word in true form from the Word Source 2 is established in complement form in the flip-flops 10 through 14. It can be seen that if given flip-flops receive a positive pulse on the one input side from the Word Source 1 and subsequently receive a positive input pulse on the complement input from the Word Source 2, then the given flip-flops will be returned to the initial zero state. If a positive pulse is applied on a line 23 to the gates 15 through 19 while the flip-flops 10 through 14 are in the zero state, no pulse is passed by the gates 15 through 19 to an OR circuit 24. Thus no pulse is passed from the OR circuit 24 on the conductor labeled "No Compare." The foregoing conditions represent the action which takes place whenever the Word Source 1 and Word Source 2 present identical words to the comparator 20. If unlike words are supplied by the Word Source 1 and Word Source 2 to the comparator 20, at least one of the flip-flops 10 through 14 will remain in the one state after the word from the Word Source 2 is transferred to the comparator 20. This is true because (1) given flip-flops which received one signals from the Word Source 1 did not receive one signals from the Word Source 2 or (2) other flip-flops which did not receive one signals from Word Source 1 did receive one signals from Word Source 2. The flip-flop or flip-flops which remain in the one state after the transfer from Word Source 1 and Word Source 2 serve to condition the associated gate so that a pulse on line 23 is passed to the OR circuit 24. This pulse is passed by the OR circuit 24 to the output conductor labeled "No Compare." It is immaterial whether more than one of the gates 15 through 19 passes a pulse to the OR circuit 24 since they are all pulsed coincident in time by the pulse on line 23. The no compare pulse may be employed in any suitable type of control apparatus, not shown, where it is desired to secure an inhibit type of control operation.

Reference is made to Fig. 2 wherein a modification of the embodiment shown in Fig. 1 is made in order to secure a no compare pulse with less equipment. Like numbers are used to designate corresponding parts shown in Fig. 1, and the input circuits of Fig. 1 are omitted in the interest of simplicity. Here gates 15 through 19 of Fig. 1 are eliminated and the one output side of each of the flip-flops 10 through 14 is connected to the OR circuit 24, the output of which is supplied to a gate 25. The operation of the embodiment of Fig. 2 is like that of the embodiment in Fig. 1 except the pulse which samples for a no compare condition is applied to the single gate 25 on a line 26. Like the operation of the embodiment in Fig. 1, the no compare pulse is generated whenever line 26 is pulsed if one or more of the flip-flops 10 through 14 are in the one state of conduction which, as pointed out above, indicates that the two words compared were unlike. Accordingly the novel comparator circuit of Fig. 2 is capable of generating a no compare pulse with a reduction in the amount of equipment, thereby enhancing both the reliability of operation and the economy of construction and repair.

Figure 3:
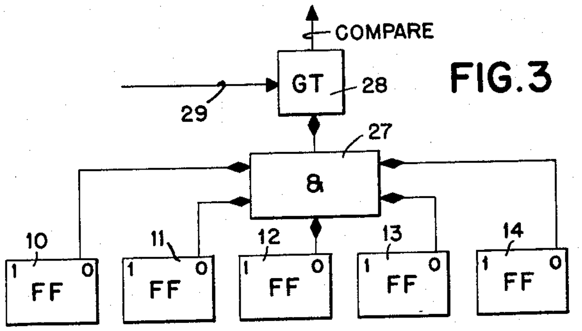
Fig. 3 shows in block schematic form a further modification of the device illustrated in Fig. 1.

Reference is made to Fig. 3 for a description of a further modification of the embodiment in Fig. 1. Like numbers are used to designate corresponding parts shown in Fig. 1, and the input equipment shown in Fig. 1 is likewise omitted here for the sake of convenience. This comparator differs from that of Fig. 1 in that an AND circuit 27 is connected to the zero output side of the flip-flops 10 through 14. The output of the AND circuit 27 is positive if all inputs are positive. When a positive pulse is applied to the gate 28 on a line 29, this gate passes the pulse if the output received from the AND circuit 27 is positive. It is recalled that all of the flip-flops 10 through 14 are returned to the zero state after a comparison is made if the two words are identical. Since the AND circuit 27 provides an output only when all of the inputs are positive, it can be seen that the gate 28 will pass the pulse received on line 29 if, and only if, the words compared are identical. Thus the output pulse from the gate 28 on the line labeled Compare is a positive pulse which may be employed in suitable control apparatus, not shown, where direct and affirmative control action is desired as contrasted with the inhibit type of control action noted in the embodiments of Figures 1 and 2. Accordingly the novel comparator circuit of Fig. 3 is capable of forming accurate comparisons with a reduction in equipment thereby providing economy as well as more reliable operation.

While there have been shown and described and pointed out the fundamental novel features of the invention as applied to preferred embodiments, it will be understood that various omissions, substitutions and changes in the form and details of the devices illustrated may be made by those skilled in the art without departing from the spirit of the invention. It is the intention therefore, to be limited only as indicated by the scope of the following claim.

What is claimed is:

A comparator comprising a storage device having a plurality of bistable elements, each said element having a first input which responds to a signal to cause said element to assume one stable state, each said element having a second input which responds to a signal to cause said element to assume a second stable state, each said element having a third input which responds to a signal to cause said element to change from the existing stable state to the opposite stable state, a first source of information signals coupled in parallel to corresponding second inputs of said elements, a second source of information signals coupled in parallel to corresponding third inputs of said elements, all of the first inputs of said elements being adapted to receive a common signal, each said element having one output conductor, an AND circuit coupled to each said one output conductor of an associated element, each AND circuit having a second input adapted to receive a signal, whereby a common signal to said first input of each element followed by signals from said first source to said second input of said elements followed by signals from said second source to said third input of said elements cause all of said elements to energize said one output conductor with a signal of a given polarity provided said first and second information signals are alike and a signal to said AND circuits causes an output signal from at least one of said AND circuits if said first and second information signals are unlike.

References Cited in the file of this patent

UNITED STATES PATENTS

| | | |
|---|---|---|
| 2,512,038 | Potts | June 20, 1950 |
| 2,596,199 | Bennett | May 13, 1952 |
| 2,609,143 | Stibitz | Sept. 2, 1952 |
| 2,615,127 | Edwards | Oct. 21, 1952 |
| 2,641,696 | Woolard | June 9, 1953 |
| 2,675,538 | Malthaner | Apr. 13, 1954 |
| 2,712,898 | Knutsen | July 12, 1955 |
| 2,735,082 | Goldberg et al. | Feb. 14, 1956 |
| 2,785,856 | Hobbs | Mar. 19, 1957 |
| 2,842,663 | Eckert et al. | July 8, 1958 |
| 2,845,220 | Bensky et al. | July 29, 1958 |

FOREIGN PATENTS

| | | |
|---|---|---|
| 156,443 | Australia | May 12, 1954 |